July 3, 1956  J. J. JAROSH ET AL  2,752,791
GYROSCOPIC APPARATUS
Filed Feb. 9, 1951
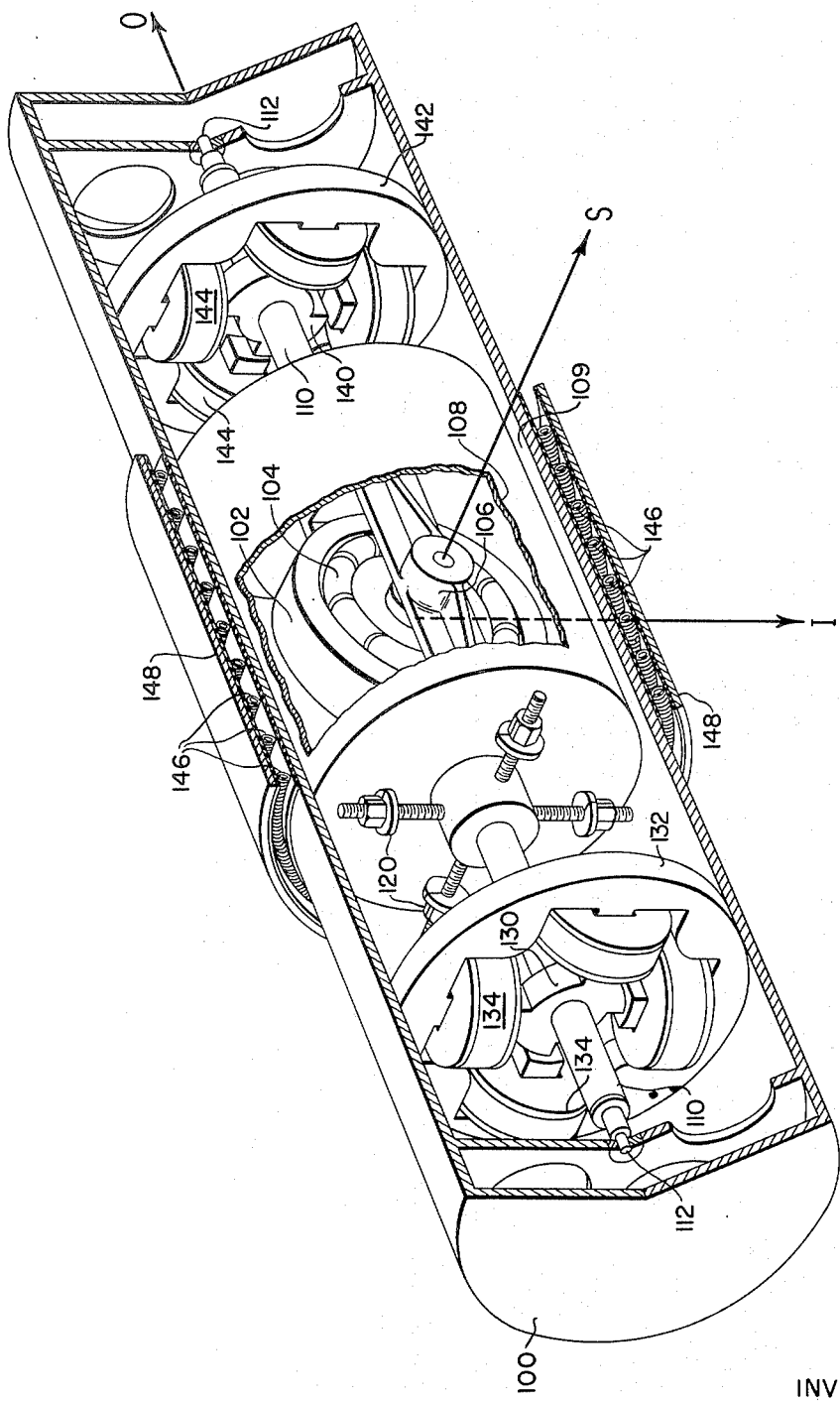
INVENTORS
JOHN J. JAROSH
CLARENCE A. HASKELL
WILLIAM W. DUNNELL, Jr.
By Kenway Jenney Witter & Hildreth
ATTORNEYS

United States Patent Office 2,752,791
Patented July 3, 1956

2,752,791
GYROSCOPIC APPARATUS

John J. Jarosh, Brookline, Mass., Clarence A. Haskell, Milwaukee, Wis., and William W. Dunnell, Jr., Boston, Mass., assignors, by mesne assignments, to Research Corporation, New York, N. Y., a corporation of New York Application February 9, 1951, Serial No. 210,246

17 Claims. (Cl. 74—5.6)

The present invention relates to gyroscopic apparatus, and more particularly to single-degree-of-freedom gyroscopic apparatus, useful in tracking, navigational and control systems.

An important example of a navigational system embodying single-degree-of-freedom gyros is that described in the copending United States application of Draper, Woodbury and Hutzenlaub, Serial No. 216,946 filed March 22, 1951. For such purposes, instruments of extreme precision are necessary, since measurements are made in seconds of arc, and it is essential to reduce uncertainties due to bearing friction and similar causes to a minimum.

It is the principal object of the present invention to provide a highly sensitive, precise, yet rugged, gyroscopic unit suitable for use in systems of this general character.

In furtherance of this and other objects as will hereinafter appear, one feature of the present invention is the use of a single-degree-of-freedom gyroscope in which the gyro unit is mounted in a chamber which is floated within a suitable case, whereby the gravity load on the bearings may be reduced to a negligibly small quantity, ideally zero. By this means, all inertial forces on the bearings are also greatly reduced. The bearing may then be of exceptional delicacy, yet with sufficient support for the unit. Such gyros are especially useful in tracking and control systems, and in navigational systems of the type described in the above-mentioned application, since motion can be detected directly in its orthogonal coordinates by the use of two or three such gyros with their input axes arranged to form a set of coordinates.

A further feature of the present invention is the provision of damping about the output axis, causing the gyro to act as an integrator and hence to tend to produce a rotation about the output axis which is proportional to the integral of the rate of deflection of the assembly about the input axis. In the best form of the invention yet devised, the damping fluid acts as the buoyant medium on the gyro assembly. Part of the fluid is preferably contained in a small annular clearance space between the float chamber and the case.

Another feature of the present invention is the inclusion in the unit of an electric signal generator to convert shaft rotations into electric signals directly. This greatly facilitates use of the gyro unit in electro-mechanical circuits. A similar feature is the inclusion of a torque generator to introduce control or reference torques on the gyro, so as to orientate it with respect to an axis whose direction in inertial space will vary (such as the vertical at different positions over the earth's surface).

The accompanying drawing is a cutaway view of the preferred embodiment of the present invention.

The illustrated embodiment of the invention comprises a case or mount 100 having a single-degree-of-freedom gyroscope consisting of a gyro rotor 102, which, together with a stator 104 constitute a synchronous motor to drive the rotor at a high constant speed about the spin axis designated S. The rotor is mounted in a frame 106 which is rigidly attached to a shaft 110, the axis of which is the output axis O of the gyro. The gyro rotor-stator assembly is enclosed in an inner cylindrical casing 108 also rigidly attached to the shaft 110. Between the casing 108 and the outer case or mount member 100, there is a small clearance space 109 (of the order of a few hundredths or thousandths of an inch). This space is filled with a high-density, high viscosity fluid to provide a damping means. The ends of the shaft 110 are journaled in bearings 112 fixed in the case 100.

The "input" axis I is perpendicular to both the spin axis S and the output axis O. The unit is sensitive only to motion of the case about the input axis I, which motion, by familiar gyroscope theory, generates an output torque $T_p$ tending to rotate the frame 106 (and hence the shaft 110 and the chamber 108) about the axis O.

$$T_p = H\omega \tag{1}$$

where H is the angular momentum of the gyro rotor, and $\omega$ is the angular velocity of rotation about the input axis. $T_p$ will be resisted by a damping torque $T_d$ proportional to the velocity of support member rotation:

$$T_d = C\frac{d\theta}{dt} \tag{2}$$

where $\theta$ is the deflection of the support member and C is the damping coefficient. Equating torques and integrating:

$$\theta = \frac{H}{C}\int \omega dt \tag{3}$$

The viscous damping fluid integrates the input angular velocity and causes the output deflection to be proportional to the input deflection.

The fluid completely fills the volume of the case 100 outside the chamber 108; in this way the fluid not only acts as a damper but also as a buoyant medium for the chamber and the entire gyro assembly. Ideally, the force on the bearings due to the weight of the gyro assembly can be completely balanced; in practice, the force is reduced to the order of one tenth of one percent. Consequently the friction in the bearings is greatly lessened, and for most applications the use of ordinary jewel or ball bearings will maintain sufficient accuracy in the gyro output. For very precise uses further accuracy may be obtained by the use of pressurized oil bearings or oil bearings.

The flotation action serves another useful function. The gyro assembly is usually fairly heavy, and if the unit is mounted in an aircraft or ship, is subjected to accelerations from motion of the vehicle. The bearings supporting the gyro assembly are necessarily delicate in order to reduce the friction force. Without flotation, these accelerations would cause substantial inertial reaction forces to act on the bearings. The viscous fluid transmits most of the inertial reaction to the case directly, and hence serves as a cushion for the gyro assembly.

Mounted on the shaft 110 is the signal generator rotor 130. The signal generator shown is preferably of the type described in the Mueller Patent No. 2,488,734 issued Nov. 22, 1949. The signal generator comprises a rotor 130 and a stator 132; a reference voltage activates the stator windings 134 and an output voltage is read out of them. The output voltage is proportional to the displacement angle of the rotor from its neutral position with respect to the stator. The rotor 130 is connected to the support member 106 by the shaft 110 and the stator 132 is connected to the outer member or case 100. Thus, the signal generator produces an output voltage proportional to the shaft rotation, which is the mechanical output of the gyro. The signal generator converts the gyro output directly into an output voltage which may be amplified for use in succeeding stages, as for example, to activate servo drives to hold a controlled member fixed in inertial space as described in the above-mentioned U. S. copending application of Draper, Woodbury and Hutzenlaub, Serial No. 216,946. No substantial energy drain need come from the gyro because the gyro output is an extremely small voltage (a few millivolts) and there is practically no resisting torque from the signal generator.

Also provided on the shaft 110 is the torque generator rotor 140. The torque generator is of the type described in the abovementioned Mueller patent. It comprises a rotor 140, a stator 142 and stator windings 144; its property is that it generates a torque between the rotor and stator proportional to the current input to the windings. Since the stator 142 and its windings 144 are mounted on the case or mount member 100, a torque is generated tending to rotate the support member (the shaft 110 and gyro frame 106) with respect to the case 100. It should be noted that the damping means integrates the torque applied by the torque generator, denoted $T_g$. At equilibrium, and without precessional torques $$T_t = T_d = C\frac{d\theta}{dt} \quad (4)$$

where $T_d$ is the damping torque, C, the damping coefficient and $\theta$ the deflection between inner member and outer member. Integrating:

$$\theta = \frac{1}{C}\int T_t dt \quad (5)$$

(Cf. Equation 3). The superposition of a torque due to input rotation will simply add terms:

$$\theta = \frac{1}{C}\int T_t dt + \frac{H}{C}\int \omega dt \quad (6)$$

In this way, the gyro unit can be used as an integrator of very high accuracy.

The provision of the torque generator also permits the gyro conveniently to be controlled so that it is sensitive to deviations about an axis that is not fixed in inertial space. For the gyro to stabilize about some such variable axis, it is desirable that the input axis I of the gyro unit be continuously held parallel to that axis. This is readily done by providing means for detecting deviations of the case of the gyro from such axis, converting such deviations to electric signals and using those signals to activate the torque generator to twist the gyro so its input axis will correspond to the axis about which stabilization is desired. This use of the gyro unit is more fully discussed in the copending United States application of Draper and Woodbury, Serial No. 216,947, filed March 22, 1951.

Balance nuts 120 are provided on the shaft to correct for any unbalance in the entire assembly. At 146 are shown heater wires mounted on a support 148. The heater is used to keep the damping fluid at a constant temperature so there will be no variation in the damping coefficient. Baffles may be provided to keep the temperature-controlled fluid clearance between the float 108 and the case 100 from mingling with the relatively uncontrolled fluid in the rest of the case volume. It has been found best to keep the fluid at a temperature well above surrounding air temperature, say 150° F. for ease in control. It is most convenient to do this by a thermostatic control mounted on the heater wire support 148, with its bulb either within the case 100 or between the case and the wires 146.

Having thus described our invention, we claim:

1. A single-degree-of-freedom gyroscopic unit comprising a case, a gyro assembly, a chamber in which the gyro assembly is mounted, support means for rotatably supporting the chamber in the case and a buoyant fluid filling the case and surrounding the chamber, said fluid being of sufficient viscosity and the chamber of such size and shape that deflections of the chamber are resisted by a torque substantially proportional to the velocity of deflection.

2. A single-degree-of-freedom gyroscopic unit comprising a case, a gyro assembly, which includes a gyro rotor and a frame in which it spins, a chamber in which the gyro assembly is mounted, a shaft and bearings for rotatably supporting the chamber in the case, and a buoyant fluid filling the case and surrounding the chamber, said fluid being of sufficient viscosity and the chamber of such size and shape that deflections of the chamber are resisted by a torque substantially proportional to the velocity of deflection.

3. A single-degree-of-freedom gyroscopic unit comprising a case, a gyro assembly, including a gyro rotor and a frame in which it spins, a chamber in which the gyro assembly is mounted, a shaft and bearings for rotatably supporting the chamber in the case, and a viscous fluid filling the case and surrounding the chamber to damp rotations of the chamber with respect to the case, said fluid being of sufficient density to serve as a buoying medium to substantially reduce the weight load of the gyro assembly on the case, and said fluid being of sufficient viscosity and the chamber of such size and shape that deflections of the chamber are resisted by a torque substantially proportional to the velocity of deflection.

4. A single-degree-of-freedom gyroscopic unit comprising a case, a gyro assembly including a gyro rotor and a frame in which it spins, a chamber in which the gyro assembly is mounted shaped to form a small clearance space between the chamber and the case, a shaft and bearings for rotatably mounting the chamber in the case, and a viscous fluid filling the case and clearance space and surrounding the chamber to damp rotations of the chamber with respect to the case, said fluid being of sufficient density to serve as a buoying medium to substantially reduce the weight load of the gyro assembly on the case, said clearance space being sufficiently small so that the viscous damping torque is substantially greater than the inertia reaction torques or friction torques associated with deflections of the gyroscope.

5. A single-degree-of-freedom gyroscopic unit comprising a case, a gyro rotor, means for spinning the gyro rotor, a frame in which the gyro rotor spins, a chamber containing the gyro rotor and frame and shaped to form a small clearance space between the chamber and the case, a shaft and bearings for mounting the chamber in the case rotatable about an axis perpendicular to the spin axis, and a viscous fluid filling the case and clearance space, and surrounding the chamber to damp rotations of the chamber with respect to the case, said fluid being of sufficient density to serve as a buoying medium to substantially reduce the weight load of the gyro assembly on the case, said clearance space being sufficiently small so that the viscous damping torque is substantially greater than the inertia reaction torques or friction torques associated with deflections of the gyroscope.

6. A single-degree-of-freedom gyroscopic unit comprising a case, a gyro assembly, a chamber in which the gyro assembly is mounted, support means for rotatably supporting the chamber in the case, a buoyant fluid filling the case and surrounding the chamber, said fluid being of such density that the weight force on the support means is substantially reduced and of such viscosity that deflections of the chamber are resisted by a torque substantially proportional to the velocity of deflection, and signal generating means arranged to generate a signal dependent on the amount of rotation of the chamber with respect to the case.

7. A single-degree-of-freedom gyroscopic unit comprising a case, a gyro assembly, a chamber in which the gyro assembly is mounted, support means for rotatably supporting the chamber in the case, a buoyant fluid filling the case and surrounding the chamber, said fluid being of such density that the weight force on the support means is substantially reduced and of such viscosity that deflections of the chamber are resisted by a torque substantially proportional to the velocity of deflection, and a signal generator comprising a rotor connected with the chamber and a stator mounted on the case, said generator being arranged to generate an electric signal dependent on the position of the rotor with respect to the stator.

8. A single-degree-of-freedom gyroscopic unit comprising a case, a gyro assembly, a chamber in which the gyro assembly is mounted, support means for rotatably supporting the chamber in the case, a buoyant fluid filling the case and surrounding the chamber, said fluid being of such density that the weight force on the support means is substantially reduced and of such viscosity that deflections of the chamber are resisted by a torque substantially proportional to the velocity of deflection, and torque generating means to produce a torque tending to rotate the chamber in the case, and means for applying an electric signal input to the torque generating means.

9. A single-degree-of-freedom gyroscopic unit comprising a case, a gyro assembly, a chamber in which the gyro assembly is mounted, bearings for rotatably supporting the chamber in the case, a buoyant fluid filling the case and surrounding the chamber, and said fluid being of such density that the weight force on the support means is substantially reduced and of such viscosity that deflections of the chamber are resisted by a torque substantially proportional to the velocity of deflection, torque generating means comprising a rotor connected to the chamber and a stator mounted on the case, said torque generating means acting to produce a torque tending to rotate the rotor with respect to the stator, and means for applying an electric signal input to the torque generating means.

10. A gyroscopic unit as claimed in claim 5 and including a signal generator comprising a rotor connected to the chamber and a stator mounted on the case arranged to generate an electric signal dependent on the position of the rotor with respect to the stator.

11. A gyroscopic unit as claimed in claim 5 and including a torque generator comprising a rotor connected to the chamber and a stator mounted on the case, said torque generator acting to produce a torque tending to rotate the rotor with respect to the stator, and means for applying an elecric signal input to the torque generator.

12. A single-degree-of-freedom gyroscopic unit comprising a case, a gyro rotor, means for spinning the gyro rotor, a frame in which the gyro rotor spins, a chamber containing the gyro rotor and frame, shaped to form a small clearance space between the chamber and the case, a shaft and bearings for mounting the chamber in the case rotatable about an axis perpendicular to the spin axis, a viscous fluid filling the case and clearance space and surrounding the chamber to damp rotations of the chamber with respect to the case, said fluid serving as a buoyant medium to support the chamber and reduce the weight load of the gyro assembly on the bearings, and a viscous damping medium, said clearance space being sufficiently small so that the viscous damping torque is substantially greater than the inertia reaction torques or friction torques associated with deflections of the gyroscope, a signal generator comprising a rotor connected to the chamber and a stator mounted on the case arranged to produce a signal dependent on the position of the rotor with respect to the stator, and a torque generator comprising a rotor connected to the chamber and a stator mounted on the case, said torque generator acting to produce a torque tending to rotate the rotor with respect to the stator, and means for applying an electric signal input to the torque generator.

13. A single-degree-of-freedom gyroscopic unit comprising a case, a gyro rotor, means for spinning the gyro rotor about an axis denoted the spin axis, a frame in which the gyro rotor spins, a chamber containing the gyro rotor and frame, shaped to form a small clearance space between the chamber and the case, a shaft and bearings for mounting the chamber in the case rotatable about an axis perpendicular to the spin axis, a viscous fluid filling the case and clearance space and surrounding the chamber, said fluid being of sufficient density so that the weight load on the bearings is substantially eliminated and of sufficient viscosity to act as a damping medium, said clearance space being sufficiently small so that the viscous damping torque is substantially greater than the inertia reaction torques or friction torques associated with deflections of the gyroscope, and temperature controlling means for maintaining the temperature of the fluid at a value substantially constant.

14. A single-degree-of-freedom gyroscopic unit comprising a case, a gyro rotor, means for spinning the gyro rotor about an axis denoted the spin axis, a frame in which the gyro rotor spins, a chamber containing the gyro rotor and frame, shaped to form a small clearance space between the chamber and the case, a shaft and bearings for mounting the chamber in the case rotatable about an axis perpendicular to the spin axis, a viscous fluid filling the case and clearance space and surrounding the chamber, said fluid being of sufficient density so that the weight load on the bearings is substantially eliminated and of sufficient viscosity to act as a damping medium, said clearance space being sufficiently small so that the viscous damping torque is substantially greater than the inertia reaction torques or friction torques associated with deflections of the gyroscope, temperature controlling means for maintaining the temperature of the fluid at a value substantially constant, a signal generator comprising a rotor connected to the chamber and a stator mounted on the case arranged to produce a signal dependent on the position of the rotor with respect to the stator, a torque generator comprising a rotor connected to the chamber and a stator mounted on the case, said torque generator being responsive to an electric input to produce a torque tending to rotate the rotor with respect to the stator, and means for applying an electric input to the torque generator.

15. A single-degree-of-freedom gyroscopic unit comprising a case, a gyro assembly, including a gyro rotor and a frame in which it spins, a chamber in which the gyro assembly is mounted, a shaft and bearings for rotatably supporting the chamber in the case about an output axis perpendicular to the spin axis of the gyro assembly, the chamber and case being shaped to form a small clearance space between them, and a viscous fluid filling the case and surrounding the chamber to damp rotations of the chamber with respect to the case, said fluid being of sufficient density to serve as a buoying medium to substantially reduce the weight load of the gyro assembly on the bearings, and said fluid being of such viscosity that deflections of the chamber are resisted by a torque substantially proportional to the velocity of deflection.

16. A single-degree-of-freedom gyroscopic unit as defined in claim 15, in which the case and chamber are of generally cylindrical shape and there is a small annular clearance space between them.

17. A single-degree-of-freedom gyroscopic unit as defined in claim 16, having generating means comprising a rotor mounted on said shaft and a stator mounted on the case.

(References on following page)

References Cited in the file of this patent

UNITED STATES PATENTS

| | | |
|---|---|---|
| 1,743,533 | Davis | Jan. 14, 1930 |
| 1,773,172 | Davis | Aug. 19, 1930 |
| 1,831,597 | Henderson | Nov. 10, 1931 |
| 1,900,709 | Henderson | Mar. 9, 1933 |
| 2,361,790 | Noxon | Oct. 31, 1944 |
| 2,512,746 | Kliever et al. | June 27, 1950 |
| 2,531,826 | Reichel | Nov. 28, 1950 |
| 2,585,024 | Lundberg | Feb. 12, 1952 |
| 2,590,428 | Noxon | Mar. 25, 1952 |
| 2,595,268 | Kellogg | May 6, 1952 |
| 2,618,159 | Johnson et al. | Nov. 18, 1952 |
| 2,623,714 | Slater | Dec. 30, 1952 |

FOREIGN PATENTS

| | | |
|---|---|---|
| 14,032 | Netherlands | Dec. 15, 1925 |